United States Patent
Nielsen et al.

(10) Patent No.: US 9,862,901 B2
(45) Date of Patent: Jan. 9, 2018

(54) APPARATUS AND METHODS FOR GASIFICATION

(71) Applicant: Pyroneer A/S, Fredericia (DK)

(72) Inventors: Rasmus Glar Nielsen, Måløv (DK); Peder Christian Stoholm, Roskilde (DK)

(73) Assignee: PYRONEER A/S, Fredericia (DK)

( * ) Notice: Subject to any disclaimer, the term of this patent is extended or adjusted under 35 U.S.C. 154(b) by 0 days.

(21) Appl. No.: 14/905,103

(22) PCT Filed: Jan. 22, 2014

(86) PCT No.: PCT/DK2014/050012
§ 371 (c)(1),
(2) Date: Jan. 14, 2016

(87) PCT Pub. No.: WO2015/007285
PCT Pub. Date: Jan. 22, 2015

(65) Prior Publication Data
US 2016/0194568 A1    Jul. 7, 2016

(30) Foreign Application Priority Data

Jul. 17, 2013 (WO) ................ PCT/DK2013/050242

(51) Int. Cl.
| | | |
|---|---|---|
| *C01B 31/02* | (2006.01) | |
| *C10J 3/56* | (2006.01) | |
| *C01B 32/05* | (2017.01) | |
| *C10J 3/48* | (2006.01) | |
| *C10J 3/66* | (2006.01) | |
| *C10J 3/84* | (2006.01) | |
| *C10J 3/54* | (2006.01) | |

(52) U.S. Cl.
CPC ................ *C10J 3/56* (2013.01); *C01B 32/05* (2017.08); *C10J 3/482* (2013.01); *C10J 3/54* (2013.01); *C10J 3/66* (2013.01); *C10J 3/84* (2013.01); *C10J 2300/094* (2013.01); *C10J 2300/0956* (2013.01); *C10J 2300/0959* (2013.01); *C10J 2300/0976* (2013.01)

(58) Field of Classification Search
CPC .................................. C01B 32/05; C10J 3/56
See application file for complete search history.

(56) References Cited

U.S. PATENT DOCUMENTS

| | | | |
|---|---|---|---|
| 4,684,375 A | | 8/1987 | Morin et al. |
| 6,669,822 B1 * | | 12/2003 | Fujimura ................ C01B 31/08 201/20 |
| 2010/0043683 A1 | | 2/2010 | Matsuzawa et al. |
| 2010/0221152 A1 | | 9/2010 | Suda et al. |
| 2011/0107945 A1 | | 5/2011 | Suda |
| 2011/0120560 A1 | | 5/2011 | Proll et al. |

FOREIGN PATENT DOCUMENTS

| | | |
|---|---|---|
| CN | 101781583 A | 7/2010 |
| CN | 101921627 A | 12/2010 |
| EP | 0 161 970 | 11/1985 |
| JP | 2010-215888 A | 9/2010 |
| WO | WO 99/32583 A1 | 7/1999 |
| WO | WO 2006/123018 | 11/2006 |
| WO | WO 2011/153568 | 12/2011 |

* cited by examiner

*Primary Examiner* — Stuart Hendrickson
(74) *Attorney, Agent, or Firm* — Womble Bond Dickinson (US) LLP

(57) ABSTRACT

Provided are apparatus and methods of gasification using a circulating fluidized bed reactor comprising a separate pyrolysis reaction chamber, one or more primary char gasification chambers, and one or more secondary char gasification chambers which comprise an internal vertical reaction volume suitable for containing a particle bed fluidized by a predominantly vertical upwards gas flow. The vertical reaction volume is advantageous in that this provides the possibility for increased retention time of particles, facilitating comparatively slow "productive" temperature moderation based on endothermic char conversion.

10 Claims, 2 Drawing Sheets

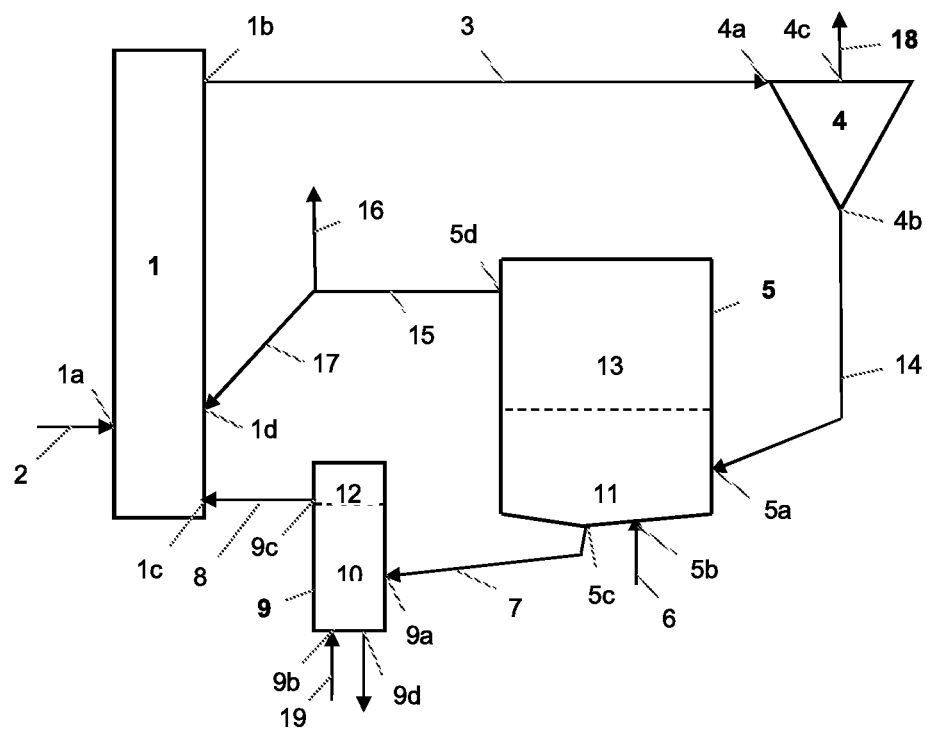
Figure 1. Generalized schematic illustration of a CFB gasifier according to the invention.

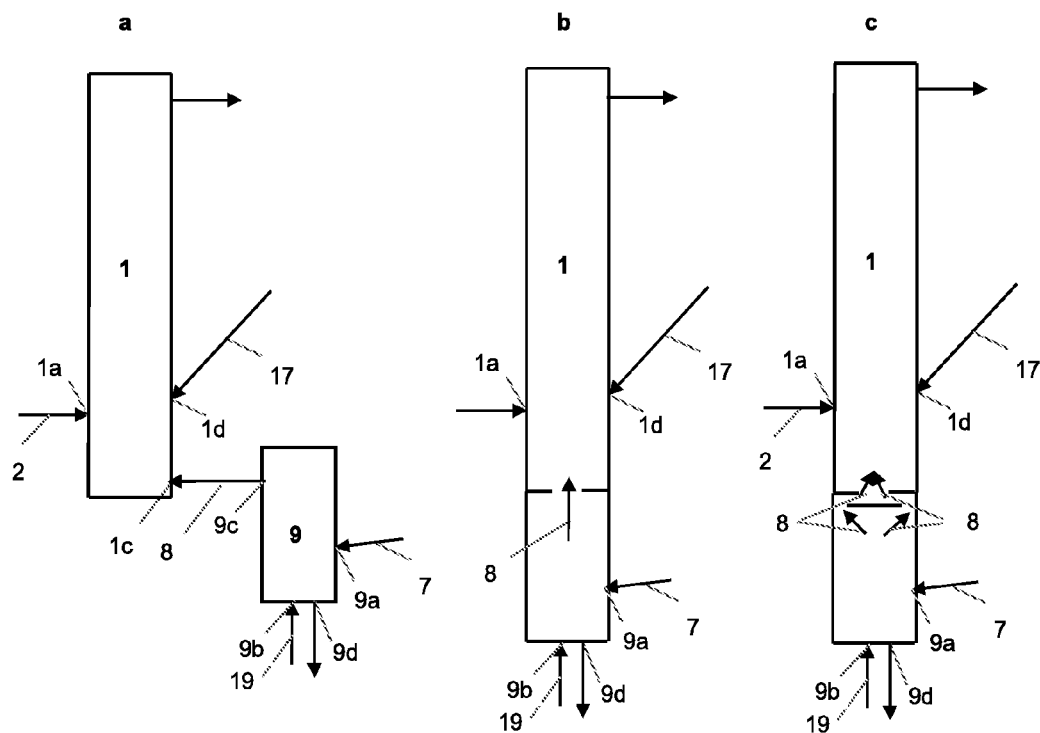
Figure 2. Schematic illustration of features of specific embodiments of a CFB reactor according to the invention.

APPARATUS AND METHODS FOR GASIFICATION

CROSS-REFERENCE TO RELATED APPLICATIONS

The present application is a U.S. National Stage of International Patent Application PCT/DK2014/050012, filed Jan. 22, 2014 and claims priority to International Patent Application No. PCT/DK2013/050242, filed Jul. 17, 2013. The disclosures of each of the applications noted above are incorporated herein by reference in their entirety.

FIELD

The invention relates to circulating fluidized bed (CFB) reactors for thermal processing of added carbonaceous material, and to processes for manufacturing combustible product gas Carbonaceous material is subject to pyrolysis in one process step with at least partial oxidation of the resulting char in at least two serial further process steps.

BACKGROUND

The document WO 99/32583 discloses a method and apparatus for gasification of solid carbonaceous material. A circulating fluidized bed (CFB) gasifier is used which is described in FIG. 1 of the document and comprises a pyrolysis reaction chamber (1), a particle separator (2) for separation of char-containing particles from the outlet gas (32) of the pyrolysis reaction chamber, a char reaction chamber (3), having at least one inlet for particles from the particle separator, and means for further recirculating particles from the char reaction chamber to the pyrolysis-reaction chamber. The dual chamber CFB gasifier's operation may be controlled in different ways. The disclosed apparatus and process functions well at comparatively low temperatures, beneath 750° C. Due to this success at unusually low and well controlled temperatures, this system is particularly well suited for organic biomass, waste streams and energy crops which contain a relatively high concentration (>0.2%) of elements such as Potassium and Phosphorus, which tend to exist in or form low melting ash components.

In large scale gasification using this multi-chamber, low temperature system, temperature control is an important operational consideration. The endothermic pyrolysis reaction is driven by heat provided by recirculating particles. This effectively requires that temperature in the char reaction chamber be maintained at least 30 or at least 50° C. higher than that which prevails in the pyrolysis chamber. Ideally, temperature in the char reaction chamber can be maintained at a level as close as practicable to, but still beneath, the ash agglomeration temperature.

Fine tuned temperature regulation generally relies on control of bed particle recirculation. We have discovered that, in this system, not only the char conversion but also control of bed particle circulation is much improved by introducing at least one secondary char reaction chamber which during operations contains a bed of particles that is fluidized by a predominantly vertical upwards flow of gas and that has a level substantially beneath the bed level in the primary char reaction chamber. Where fluidizing gas is added in the secondary char reaction chamber, it is necessarily added beneath the level of fuel addition in the pyrolysis chamber. The gas flow through and out of the secondary char reaction chamber acts as to reduce the bed densities in the secondary char reaction chamber as well as in the pyrolysis chamber thereby increasing the overall particle circulation out of the pyrolysis chamber, and in turn from the primary char reaction chamber, without requirement for substantial addition of fluidizing gas to the pyrolysis chamber itself. In this manner, it is possible to fully or nearly avoid introduction of air into the pyrolysis chamber, and the associated reduction in heating value of the product gas.

Even where air is used as fluidizing gas, when this is added to the secondary char reaction chamber, no unwanted oxygen enters the pyrolysis chamber because it is consumed in the secondary char reaction chamber. Unwanted temperature increases from primarily oxygen reacting exothermic with char can be avoided through increased introduction of steam in the secondary char reaction chamber. This added steam contributes to "productive" cooling, whereby endothermic char conversion is achieved with associated production of combustible, water-derived hydrogen gas. The addition of air and steam in the secondary char reaction chamber improves overall char conversion efficiency and decreases the load of fine recirculating char particles experienced by the particle separator.

Surprisingly, all of these benefits of a serial, secondary char conversion system, most notably including "productive" temperature moderation based on endothermic char conversion, can be achieved in a secondary char reaction chamber that comprises a comparatively small percentage of the total volume of the primary char reactor system. By selectively maintaining a relatively low nominal gas velocity and a relatively high ratio of steam to air in the fluidizing gas input, a comparatively small secondary char reaction chamber can contribute to efficient circulation control in a multi-chamber, low-temperature CFB system.

BRIEF DESCRIPTION OF THE DRAWINGS

FIG. 1 shows a generalized schematic illustration of a CFB reactor according to the invention indicating the relative position of units and conduits through which gas and particles flow.

FIG. 2 shows a schematic illustration of features of specific embodiments of a CFB reactor.

DEFINITIONS

Mean temperature in a reaction volume refers to the temperature at a level corresponding to half the height of the volume.

Primary char gasification chamber refers to an enclosure providing a reaction volume in which char contained in the recirculating particles from the pyrolysis chamber are subject to reactions producing gas.

Secondary char gasification chamber refers to an enclosure comprising an internal vertical reaction volume suitable for containing a particle bed fluidized by a predominantly vertically upwards gas flow that is in fluid communication with a defined inlet and outlet conduit, which inlet and outlet conduit may be configured so as to contribute to overall internal reaction volume, and in which recirculating char particles from a char reaction chamber are subject to reactions producing gas.

Vertical reaction volume refers to an enclosed volume through which hot gas would tend to flow in an upright flowpath having a slope of 90+/−10 degrees.

DETAILED DESCRIPTION OF EMBODIMENTS

In some embodiments, the invention provides a circulating fluidized bed (CFB) reactor as shown schematically in FIG. 1 comprising:

a first pyrolysis reaction chamber (1) comprising at least one inlet (1a) for carbonaceous material (2), at least one inlet (1c) for fluidizing gas, and at least one outlet (1b) for product gas situated in its upper part, one or more separators (4) each of which is in fluid communication with an outlet for product gas from the pyrolysis chamber and has an inlet (4a) through which product gas carrying char and inert particles from the first pyrolysis reaction chamber (1) is received, and an outlet (4b) through which a separated part of char and inert particles leave each separator and enter into a primary char gasification chamber (5) via one or more conduits (14), and one or more primary char gasification chambers (5) each of which is in fluid communication with at least one particle separator (4) and each of which comprises an inlet (5a) for receiving recirculating char and inert particles situated in its lower part, at least one inlet (5b) for fluidizing gas (6) situated in its lower part, an outlet (5c) for recirculating particles situated within its bottom, which bottom comprises one or several surface elements collectively sloping downwards against the outlet so as to collect and effectively drain particles, and opening into a particle recirculation conduit (7) which particle recirculation conduit (7) opens into one or more secondary char gasification chambers (9), and each of which secondary char gasification chambers (9) comprises an internal vertical reaction volume suitable for containing a particle bed fluidized by a predominantly vertical upwards gas flow, an inlet (9a) for receiving recirculating particles, at least one inlet (9b) for a fluidizing gas situated in its lower part, an outlet (9c) for produced gas and recirculating particles situated in its upper part, and an outlet (9d) for removing surplus or otherwise unwanted particles situated in its lower part, wherein the one or more secondary char gasification chambers collectively comprise at least one inlet (9a) for particles from a primary char gasification chamber (5), and at least one outlet (9b) in fluid communication with the lower part of the first reaction chamber (1) which provides fluidizing gas to the first reaction chamber (1), and wherein said one or more secondary char gasification chambers (9) collectively comprise an internal vertical reaction volume of at least 2% and less than 30% of the collective volume of the one or more primary char gasification chambers.

FIG. 1 provides a schematic illustration only and is not intended to be limiting in terms of relative geometric proportions of the various components.

In some embodiments, the one or several surface elements collectively sloping downwards against the outlet (5c) provide a downward sloping, conical or convex bottom surface.

Surprisingly, where the bottom surface of a primary char gasification chamber (9) comprises one or several surface elements collectively sloping downwards against the outlet (5c) so as to collect and effectively drain particles, the fluid connection with a secondary char gasification chamber is advantageous in enhancing bed height difference, meaning that the top of a secondary char gasification chamber can be efficiently situated relatively close to the bottom of a primary char gasification chamber.

The vertical reaction volume within a secondary char gasification chamber is advantageous in that this provides the possibility for increased retention time of particles facilitating comparatively slow, "productive" temperature moderation based on endothermic char conversion.

In some embodiments, each of the one or more primary char gasification chambers (5) comprises an outlet (5d) in its upper part for produced gas which outlet is in fluid communication with the pyrolysis reaction chamber (1) through conduit (15/17), or alternatively any part may be removed from the CFB reactor through conduit (15/16). This is generally advantageous, in that gas from the primary char gasification chambers in this way are cooled to the temperature in the pyrolysis chamber while contributing to fluidization and upwards transport of the pyrolysis bed material, particularly when introduced into the pyrolysis chamber through an inlet (1d) that can be advantageously located at a vertical level close to the vertical level of the inlet (1a) for carbonaceous feed material (2). In some embodiments, gas produced in the primary char gasification chamber may instead fully or partly be removed from the CFB reactor as product gas through outlet (5d) and conduit (15/17).

In large scale, the pyrolysis chamber is typically fed by 2-4 separate fuel inlets, for example equipped with screw feeders. Typically, a relatively small amount of fluidizing gas is input to the pyrolysis chamber through several nozzles distributed at the bottom of the pyrolysis chamber so as to ensure fluidization of the entire chamber cross section. Outlets for product gas from larger scale reactors may comprise several more-or-less separate outlets feeding into separate particle separators or one large outlet feeding into multiple separators.

In large scale, multiple particle separators may be configured to feed into a single primary char gasification chamber. Alternatively, each individual separator may feed a separate parallel primary char gasification chamber. Within primary char gasification chambers, fluidizing gas is typically distributed through a series of nozzles, which may be configured to provide controlled gas streams to separate areas and levels of the reaction chamber. The inlets for fluidizing gas are typically situated in the lower part of the gasification chamber, meaning the lower half.

In large scale, secondary char gasification chambers may also be included either as a single chamber or as a collection of chambers. A collection of secondary char gasification chambers may be arranged in parallel, i.e. so as to define separate process paths between the primary char gasification chamber and the pyrolysis chamber, or in series, i.e. defining a process path whereby recirculating particles from the primary char gasification chamber are routed through a series of secondary char gasification chambers before being carried forward to the pyrolysis chamber.

In some embodiments, said one or more secondary char gasification chambers (9) collectively comprise an internal vertical reaction volume of at least 2% and less than 30%, or at least 3% and less than 20%, or at least 4% and less than 15% of the collective volume of the one or more primary char gasification chambers (5), excluding ducts and conduits.

In some embodiments, said one or more secondary char gasification chambers (9) collectively comprise an overall internal reaction volume of at least 2% 3% and less than 50%, or at least 5% and less than 40%, or at least 6% and less than 30% of the collective volume of the one or more primary char reaction chambers (5).

In some embodiments, where a serial arrangement of secondary char gasification chambers is included, the sum of the heights of the enclosed internal vertical reaction volume of secondary char gasification chambers is at least 5%, or between 10-70%, or between 15-50%, or between 20-60% of the sum of the height of primary char gasification chambers. In embodiments where only a single secondary char gasification chamber is included or where more than one secondary char gasification chamber are included configured in parallel, the height of each of the enclosed internal vertical reaction volumes of each secondary char gasification chamber is at least 5%, or between 10-70%, or between 15-50%, or between 20-60% of the average height of primary char gasification chambers.

In some embodiments, where a serial arrangement of secondary char gasification chambers is included, the sum of the horizontal square section of the enclosed internal vertical reaction volume of secondary gasification chambers is at least 5%, or between 10-50%, or between 15-40% of the sum of the widest horizontal square section of primary char gasification chambers. In embodiments where only a single secondary char gasification chamber is included or where more than one secondary char gasification chamber are included configured in parallel, the horizontal square section of each of the enclosed internal vertical reaction volumes of each secondary gasification chamber is at least 5%, or between 10-50%, or between 15-40% of the sum of the widest horizontal square section of primary char gasification chambers. In embodiments where only a single secondary char gasification chamber is included or where more than one secondary char gasification chamber are included configured in parallel, the horizontal square section of each of the enclosed internal vertical reaction volumes of each secondary gasification chamber is at least 5%, or between 10-95%, or between 30-70%, or between 40-90%, or between 50-85% of the sum of the widest horizontal square section of the pyrolysis reaction chamber.

In some embodiments, in each of the one or more primary char gasification chambers, the outlet (5c) for recirculating particles is situated within its bottom surface so as to receive particles collected by a downward sloping, conical or convex bottom surface. In some embodiments, this arrangement may alternatively be that the outlet (5c) is situated in the lower part of the primary char reactor, or located at the bottom of the chamber, or in some embodiments at the center of the bottom of the chamber, without requirement for a downward sloping, conical or convex bottom surface per se.

In some embodiments, the reactor is configured such that the top of each of the one or more secondary char gasification chambers is placed at a level that is intermediate between the levels of the top of the highest and the level of the bottom of the lowest of one or more primary char gasification chambers. In this context, the level is "intermediate" where it is at any level lower than the top and higher than the bottom of a primary char gasification chambers. In some embodiments, the top of one or more secondary char gasification chambers is placed at the same level as the bottom of one or more primary char gasification chamber.

In some embodiments, the reactor is configured such that the top of one or more secondary char gasification chambers (9) is placed at a level that is higher than the lowest level in one or more primary char gasification chambers (5) at which the majority of fluidizing gas is introduced.

In some embodiments, the reactor is configured such that greater than 50% of the internal vertical reaction volume of each of the one or more secondary char gasification chambers is placed at a level beneath the lowest level of one or more primary char gasification chambers at which the main part of fluidization gas is introduced. In some embodiments, the reactor is configured such that greater than 50% of the internal vertical reaction volume of each of the one or more secondary char gasification chambers is placed at a level beneath the bottom of the lowest of the one or more primary char gasification chambers.

In some embodiments, the inlet (1c) for fluidizing gas and particles from the secondary char gasification chamber (9) is positioned below i.e. upstream the inlet (1d) for gas from the fluidized bed char gasification chamber (5).

In some embodiments, the inlet (1c) for recirculating particles from the secondary char gasification chamber (9) is positioned below i.e. upstream all major inlets (1a) for carbonaceous material into the pyrolysis reaction chamber (1).

In some embodiments, the fluid connection between an outlet in a secondary char gasification chamber (9c) and the pyrolysis chamber (1) comprises an essentially horizontal duct, as shown in FIG. 2 a. Shown are connections with primary char gasification chambers and secondary char gasification chambers according to the numbering used in FIG. 1. When the free internal height of such an essentially horizontal connection duct is made small compared to the length of the duct, the particles in the pyrolysis reaction chamber will not essentially fluctuate backwards against the mixed stream of product gas and recirculating particles flowing from the secondary char reaction chamber to the pyrolysis reaction chamber. Preferably, the internal length of the duct is more than 2 times the internal height and even more preferable the length of the duct is more than 4 times the internal height.

In this way, the shape of the connection between a secondary char reaction chamber and the pyrolysis reaction chamber prevents particles in the bottom of the pyrolysis reactor from back mixing into the secondary char reaction chamber. Such particle back mixing would also imply thermal back mixing which can impede the benefits of keeping the temperature in the secondary char reaction chamber considerably higher than the temperature in the pyrolysis reaction chamber, which would otherwise occur.

In some embodiments, at least one secondary char reactor can be configured essentially in line under the pyrolysis reactor, and in this case the unwanted back mixing can instead be prevented as shown e.g. in the FIGS. 2 b and c.

The solution shown in FIG. 2 b comprises a simple narrowed connection wherein the upwards gas velocity—due to the contraction—is high enough to prevent the normal sized char and inert bed particles from falling downwards from the pyrolysis reactor and into the secondary char reactor. Only the most fluid dynamically heavy particles such as potential content of comparatively unreactive impurities in the carbonaceous feed stock added to the pyrolysis chamber or internally formatted agglomerates can pass downwards through the narrowed connection. In this case it is a simplification and hence and advantage that only the single outlet shown in the bottom of the secondary char reactor can serve as a drain for taking out oversize particles also from the pyrolysis chamber.

The further in-line solution shown in figure c prevents the unwanted back mixing in the same way as in "a", i.e. based on one or several narrow essentially horizontal connection passages which are embedded in the internal plate forming the bottom of the Pyrolysis chamber as well as the roof of the secondary char reaction chamber.

In some embodiments, the invention provides a process for manufacturing a product gas having a desirable heating value from a carbonaceous material, comprising
a first process step where the carbonaceous material is introduced into a first pyrolysis reaction chamber in which are flowing a fluidization gas having a low $O_2$ content and hot inert recirculating particles, and in which the temperature $T_1$ is between 400 and 850° C., producing a product gas which carries partly converted particles i.e. char and recirculating bed particles out of the first process step, a second process step where the product gas from the first step is separated from the recirculating and partly converted char particles, where the product gas exits the process while the separated char particles and bed particles enter a third process step, a third process step, conducted in one or more primary char gasification chambers, each of which comprises a fluidized particle bed where carbonaceous material remaining in the separated char is subjected to a decomposing oxidation treatment in a fluidized bed at a temperature $T_2$ between 600 and 850° C., producing a product gas which is withdrawn from the upper part of each of the one or more primary char reactors, while bed particles from the lower part of each of the one or more primary char reactors are transferred to a fourth process step, and a fourth process step, conducted in one or more secondary char gasification chambers each of which comprises a particle bed fluidized by a predominantly vertical gas flow where remaining char is subjected to a second decomposing oxidation treatment in a fluidized bed at a temperature $T_3$ between 600 and 850° C., producing a product gas which, together with recirculating particles, exits the fourth step and enters the first process step as a fluidizing gas.

In some embodiments, the four process steps are conducted within a CFB gasifier having any of the features described herein.

In some embodiments, in the fourth process step, the bed in each of the one or more secondary char gasification chambers is fluidized using a gas having a higher weight ratio of steam to air than the average weight ratio of steam to air of the gas used to fluidize the beds in the one or more primary char gasification chambers in the third process step. In some embodiments, in the fourth process step, the average area specific fluidizing gas flow in the one or more secondary char gasification chambers is in kg/m²/sec less than the average areas specific gas fluidizing flow collectively in the one or more primary char gasification chambers used in the third process step.

As used herein, the weight ratio of steam to air or the average area specific fluidizing gas flow is higher when consistently measured as an overall average over some short period of time, for example, 1 hours, 4 hours, 12 hours, 24 hours, or when measured as a running total over a long period of time, for example 1000 hours, or 4000 hours, or 6000 hours.

In some embodiments, in the fourth process step, the mean temperature within the internal vertical reaction volume within each of the one or more secondary char gasification chambers is maintained at a temperature less than 5° C. greater than the average mean temperature within the internal reaction volume of the one or more primary char gasification chambers.

In some embodiments, in the fourth process step, mass flow of fluidizing gas to each of the one or more secondary char gasification chambers is automatically controlled in response to temperature measurements in the pyrolysis chamber. In some embodiments, fluidizing gas flow is decreased where temperature is increased above some set point and increased where temperature is decreased beneath some set point. In some embodiments, the temperature measurements in the pyrolysis chamber are taken from the upper part of the pyrolysis chamber.

In some embodiments, in the third process step, product gas, fully or primarily enters the first process step, together with a fraction of fine entrained particles, while bed particles from the lower part of the primary char reactor are transferred to a fourth process step, In some embodiments, the first process step is conducted in an atmosphere having a low content of O2, typically <1% or less than 5%.

In some embodiments, the temperature $T_2$ of the third process step and the temperature $T_3$ of the fourth process step differs with less than 10° C., i.e. $T_3-T_2<10°$ C., normally $T_3-T_2<5°$ C. In some embodiments, the temperature $T_1$ is between 400 and 750° C., normally between 450 and 725° C., and even more preferably between 500 and 700° C.

In some embodiments, the temperature $T_2$ is between 650 and 850° C., normally between 700 and 800° C.

In some embodiments, at least 95 wt % of the bed material in the third process step is inert particle material while at most 5 wt % of the material is carbonaceous material in the form of char.

In some embodiments, the carbonaceous material fed to the pyrolysis reactor as fuel has a content of ashes above 1% by weight and might have an ash content between 5-50% by weight.

In some embodiments, the carbonaceous material used as fuel has a high content of greater than 0.2% by weight or greater than 0.3% by weight potassium (K), chlorine (Cl) and/or phosphor (P) including in some cases, for example cereal straw, rice straw, and related grain cleaning waste streams; residues from further crops including sugar cane, sorghum and beets, maize, potato, nuts, tea, cotton, olive, wine and oil palms, Algaes—eg. including sea weed, and potential further marine/aquatic derived organic material; energy crops such as grasses—incl. eg. Miscantus—and short rotation forest based on fast growing wood like Willow and Poplar; Crops having an elevated content of salt due to e.g. growth in proximity with salty water or having other contact with salty water; residues from meat production industry such as meat and bone meal; animal manure including dewatered manure slurry; Municipal and industrial organic waste, including organic fractions derived from such streams, sewage sludge, etc.; energy containing residues such as fiber and lignin products from processing wood and raw organic products such as those mentioned above by means of e.g. hydrolysis, extraction and fermentation etc. In some embodiments any of the above listed carbonaceous material may be used as fuel, regardless of potassium (K), chlorine (Cl) and/or phosphor (P) content.

In some embodiments, a small amount of fluidizing gas (usually air), typically less than 15% of the flow of product gas, is added through nozzles distributed in the bottom of the pyrolysis chamber, in order to keep particles freely flowing and well mixed. In some embodiments, the reactor is configured such that nozzles through which fluidizing gas may be introduced are located within the bottom 15% of the pyrolysis chamber. As used herein a nozzle is located within the bottom 15% where the distance from the bottom surface of the pyrolysis chamber is 15% or less of the total distance between the bottom and top surface of the pyrolysis chamber. Any reference to situation "within the lower part" herein may optionally be further restricted to "situated within the bottom 15%."

FIG. 1 shows a generalized schematic illustration of a CFB reactor according to the present invention and illustrates how the units of the CFB reactor can be connected.

The figure shows a first reaction chamber 1 provided with an inlet 1a through which inlet 1a carbonaceous material 2 is fed. The first reaction chamber 1 further comprises an outlet 1b for particle loaded product gas, an inlet 1c for fluidization gas and an inlet 1d for product gas from a primary char gasification chamber 5. Said fluidization gas added thorough inlet 1c may be supplemented by the addition of more fluidization gas added through one or more nozzles providing for a satisfying distribution of gas and particles in the bottom part of first reaction chamber 1.

Generally, embodiments of CFB reactors according to the present invention comprise a first reaction chamber 1 wherein carbonaceous material is pyrolysed due to contact with hot recirculating particles. That the carbonaceous material is pyrolysed means that the material is decomposed due to heating and not due to oxidation; pyrolysis is an endothermic process requiring addition of heat to the pyrolysing carbonaceous material. The hot circulating particles transporting heat to the first reaction chamber 1 is normally sand but might be any inert particulate material being adequately resistant to wear.

A feed of carbonaceous material 2 is fed to the first reaction chamber 1 through an inlet 1a; the carbonaceous material can be any carbonaceous material such as organic material, coal or products based on petroleum but normally the carbonaceous material is an organic material such as straw or other vegetable waste, soft lignocellulosic biomass such as agricultural residues, manure, household rubbish, dried wastewater sludge, dried animal remains or other such carbonaceous waste products, optionally mixed with inorganic material The first reaction chamber 1 has a supply of fluidizing gas in the bottom of the chamber which fluidizing gas provides a fluid bed for reaction and transport of particles in the first reaction chamber, the particles are transported from the bottom of the chamber to a top outlet 1b of the first reaction chamber 1. Typically, the atmosphere in the first reaction chamber 1 is kept low in oxygen in order to reduce the occurrence of oxidizing reactions according to which the carbonaceous material partly ends up as $CO_2$, and $H_2O$, i.e. producing heat instead of combustible products. Low oxygen content favors pyrolysis i.e. heat decomposition of the carbonaceous material and normally, the oxygen content in the atmosphere of the first reaction chamber 1 is very low. For example, the oxygen content in chamber 1 is typically less than 1%, or less than 5%. In some embodiments, fluidizing gas is provided primarily from the secondary char gasification chamber 9 in which chamber char oxidizing reactions occur which produce heat and which reduce oxygen content of the product gas leaving the chamber 9. In some embodiments, some supplemental fluidizing gas may also be added directly to chamber 1.

The optimum temperature in the first reaction chamber 1 depends on what kind of carbonaceous material is being gasified and also the purpose of the product gas and residual ash/solid products. It is typically advantageous to choose a temperature in the first reaction chamber 1 which is sufficient to make the carbonaceous material decompose to a high degree while the temperature should not be high enough to cause agglomeration of the decomposing material and recirculating bed material. Moreover, environmentally problematic and therefor unwanted polyaromatic hydrocarbons (PAH) tend to be produced at high pyrolysis temperature and at temperatures beyond 650-700° C. it typically also becomes harder to retain a major part of Cl and S in the solid phase in order to separate such components as contained in separated ash. Normally if the carbonaceous material is a usual organic material, the mean pyrolysis temperature will be advantageous between 400 and 800° C. For efficiently gasifying normally dry biofuels material such as straw the temperature will more typically be between 620-700° C. and for typically high ash and therefor very low heating value fuels such as anaerobically digested and perhaps not efficiently dewatered manure from farming animals and such as pre treated sewage sludge, the temperature will more typically be between 500-650° C. Even lower pyrolysis temperatures can be chosen e.g. for the purpose of producing bio oil, food flavor (sometimes also called liquid smoke) and/or bio char.

The temperature in the first reaction chamber 1 is during operation normally controlled mainly by adjusting air flow into the secondary char gasification chamber 9 and/or by adjusting the total amount of particles in the gasifier.

During initial start up the reaction chambers might be heated to temperature of operation by the use of extra burners—and/or after such initial heating also by adding fuel and air/oxygen to e.g. the first reaction chamber 1.

When the product gas carrying particles of char and recirculating particles leaves the first reaction chamber 1 through outlet 1b, the product gas via one or more conduits 3 enters into one or several parallel separators 4 via inlets 4a, the product gas, together with a fine fraction of the particles, leaves the separator 4 through an outlet 4c entering a conduit 18 and the separated particles exits the separator 4 through an outlet 4b entering a conduit 14. The conduit 14 transports the particles to the bottom of a char gasification chamber 5 where the particles are received in a fluid bed 11. The purpose of the separators 4 is to separate the product gas from the main part of the entrained particles as this main part of the particles have to be conveyed to a primary char gasification chamber 5.

The particle separation can be performed using any type of particle separator such as dynamic separators, e.g. turn chamber-, labyrinth, and cyclone separators, or barrier filters, e.g. high temperature bag filters, porous ceramic filters or granular bed type filters, including combinations of the mentioned separators. According to one embodiment the product gas from the first reaction chamber is first cleaned in a primary dynamic separator and thereafter in a secondary, more effective type separator. The re-circulation of particles to the char gasification chamber 5 is in this case primarily performed from the first mentioned primary dynamic separator. The secondary separator may e.g. be just a more efficient cyclone separator or a highly efficient barrier or electrostatic filter.

Normally, the conduit 14 transporting particles from a separator to aprimary char gasification chamber 5 will be provided with means or so constructed that gas is prevented from rising from the primary char gasification chamber 5 through the conduit 14 and enter into the separator.

Generally, as much as 70-80% of the organic part of the carbonaceous material is released as gas during pyrolysis and as much as 20-30% of the organic part of the carbonaceous material remains in solid form, i.e. in char particles. The energy remaining in the char typically constitutes around 30-40% of the total energy content of the original carbonaceous fuel material. Char particles are oxidized at the temperatures prevailing in the char gasification chamber by introduction of a gasification agent such as air and steam. Where oxygen in the free form such as oxygen in in air, the resulting production of partially combustible gas, is exothermic and therefor the temperature in the char gasification chamber is increased. However endothermic, steam-based char conversion reactions can also be conducted which also produce a partially combustible gas but in this case the reactions are endothermic and therefore serve as to lower/moderate the temperature. The double purpose of the primary char gasification chamber 5 is to heat up the mainly inert re-circulating particles and to optimize char conversion i.e. to optimize recovery of combustible gas from the carbonaceous particles which have been previously subjected to pyrolysis. A fine fraction of the char particles will be lost in the separator section but normally at least 80% will be transferred from the separator section to the primary char gasification chamber 5.

The primary char gasification chamber 5 comprises an inlet 5a for pyrolysed and inert recirculating particles, it also comprises an inlet 5b for fluidizing gas which in the figure is supplied via at least one conduit 6 in the lower part of the primary char gasification chamber 5. The fluidizing gas is normally supplied to the primary char gasification chamber 5 through many nozzles (not shown) and/or other air distributing means assuring a flow pattern suitable for maintaining a fluid bed in the chamber. Normally, the primary char gasification chamber 5 has a bubbling or turbulent fluidized bed in the lower part. Normally, the gasification agents also serves as the fluidizing gas and is a mixture of mainly air and some steam ($H_2O$) which will increase the temperature of the particles recirculated through the primary char reaction chamber 5 I-The char gasification chamber may also have one or more more-or-less separate inlets for liquid gasifying agents such as water—which will more effectively than steam lower the temperature in the chamber.

A primary char gasification chamber 5 comprises an outlet 5d in the upper part of the char gasification chamber 5 for gas and an outlet 5c for particles in the bottom part of the char gasification chamber 5. The outlet 5c opens into a particle return conduit 7 which particle return conduit 7 opens into a secondary char gasification chamber 9 through inlet 9a, this secondary char gasification chamber being in an intermediate position in relation to the first reaction chamber 5 and the pyrolysis chamber 1.

The mean temperature in the primary char gasification chamber 5 will normally be at least 50° C. higher than the temperature in the first reaction chamber 1, which will normally mean that the particles entering the first reaction chamber 1 via the inlet 1c is at least 50° C. higher than the desired operating temperature in the first reaction chamber 1. In the case of using high alkaline fuels, the temperature in the primary char gasification chamber 5 is normally kept below 770° C.

The atmosphere in the primary char gasification chamber 5 contains oxygen which results in that exothermic oxidizing reactions take place in the primary char gasification chamber 5. The oxygen content in the atmosphere of the primary char gasification chamber 5 during operation is high enough to decompose most of the char material by oxidation. However, in typical embodiments, the oxygen content in the added gasification agent is maintained well below sub-stoichiometric levels, meaning that there is insufficient oxygen to fully oxidize all of the char material added to the primary char gasification chamber 5 via inlet 5a. During operation a fluidized bed 11 of particles is provided in the lower part of primary char gasification chamber 5. The volume of this fluidized bed 11 which is normally a bubbling fluid bed is defined as the volume present above the level of adding the fluidizing gas at the bottom of the fluidized bed and up to the surface of the same fluidized bed. The height $h_{11}$ of the fluid bed 11 is indicated on the figure by the dotted line. The height $h_{11}$ of the fluidized bed 11 can be evaluated and maintained on a desired level by measuring differential pressures in the fluidized bed and by comparing these pressures to pressures measured in the freeboard volume 13. Said freeboard volume 13 is above the volume of the fluidized bed 11 and this freeboard volume 13 contains gas and particles being too fine to remain in the bubbling bed and instead are carried with the gas to the outlet 5d and into the conduit 15. After the gas has left the char gasification chamber 5, the gas can either enter the first reaction chamber 1 through the conduit 17 and the inlet 1d or part of the gas or all the gas can leave the CFB reactor through conduit 16.

The particles leaving a primary char gasification chamber 5 through the bottom exit 5c enter the a secondary char gasification chamber 9 through inlet 9a. The secondary char gasification chamber 9 further comprises an inlet 9b for adding fluidizing gas in the lower part of the reactor 9 and this way a fluidized bed 10 is formed in the secondary char gasification chamber 9. The added fluidizing gas is typically mainly air but might also be other gasification agents such as $O_2$ and/or steam ($H_2O$) while a further gasification agent might be liquid water which might be introduced through separates inlets. Also, the secondary char gasification chamber 9 comprises an outlet 9c for produced gas carrying particles from the upper part of the chamber 9 which outlet 9c opens into a conduit 8 having at least one outlet to the lower part of the first reaction chamber 1. I.e. a secondary char gasification chamber 9 provides fluidizing gas to the first reaction chamber 1 and as the gas produced in a secondary char gasification chamber 9 is deprived of oxygen it is not necessary to add a major amount of further oxygen depleted fluidizing gas to the bottom of the first reaction chamber 1 and in particular the use of inert gas such as $N_2$ as fluidizing gas can be avoided.

During normal operation most of the particles entering the secondary reactor 9 through the inlet 9a are transported upwards to the outlet 9c Exceptions are char particles being converted to gas within the reaction chamber 9 and that surplus particles constituting an ash stream might be removed from the bottom of the chamber 9.

Normally, less than 30% of the char decomposition takes place in a secondary char gasification chamber 9 and more than 70% of the char decomposition takes place in a primary char gasification chamber 5. This and also at least a minimum (clear) extent of benefits of including the secondary reactor 9 is achieved by adding typically between 70% to 95% of the total mass flow of gasification agents to the primary char reactor 5 while adding the rest, i.e. between 30% and 5% to the secondary reactor.

In order to free the energy remaining in the char which constitutes a considerable part of the total energy of the carbonaceous fuel material fed to the CFB reactor, it is desirable to operate a primary char gasification chamber 5 at as high a temperature as possible without risking agglomeration of the particles in the fluid bed. If the highest allowable temperature is obtained in the primary char gasification chamber 5 it will be a problem that the temperature in the downstream fluid bed i.e. the fluid bed in a secondary char gasification chamber is 10-20° C. higher than the temperature in the char primary gasification chamber 5 as this can cause agglomeration of the material and result in shutting down of the CFB reactor or require a lower temperature in the primary char gasification chamber By selectively maintaining a low nominal gas velocity, slower, steam-based endothermic reactions will be better allowed to take place in a secondary char gasification chamber 9 supplemental to the dominating and faster exothermic reactions. Steam-based endothermic reactions are also promoted by use of a higher steam to oxygen ratio in the gasification agent introduced to the secondary char gasification chamber compared with that used in the primary char gasification chamber. For the most typical example of adding oxygen by adding air, suitable steam to air mass flow ratios in the secondary chamber is higher than the corresponding ratio in the primary char gasification chamber and typically at least 0.05 (i.e. >5% steam) may be as high as 0.1 or 0.2 or 0.5. By giving the endothermic reactions time to occur, the mean temperature in a secondary char gasification chamber will become lower and it will be possible to maintain a temperature in a secondary char gasification chamber which is less than 10° C. and preferably less than 5° C. higher than the temperature in the primary char gasification chamber 5. Providing the said extra gas retention time in the secondary char gasification chamber and this way converting more char by means of slow endothermal reactions is also a better solution for avoiding said problematic temperature increase than providing e.g. the same cooling effect by just adding extra badly converted steam or water.

The product gas typically has a higher heating value between 4-8 MJ/Nm$^3$. This range of heating values is typical for mainly air blown gasifiers, while higher heating values can be obtained by using a gasification agent that has a higher content of oxygen compared to Nitrogen.

The description of embodiments provided is representative only and not intended to limit the scope of the inventions as defined by the claims.

The invention claimed is:

1. A process for manufacturing a product gas having a desirable heating value from a carbonaceous material conducted using a CFB gasifier, said method comprising a first process step where the carbonaceous material is introduced into a first pyrolysis reaction chamber in which are flowing a fluidization gas having a low $O_2$ content and hot inert recirculating particles, and in which the temperature $T_1$ is between 400 and 850° C., producing a product gas which carries partly converted particles i.e. char and recirculating bed particles out of the first process step, a second process step where the product gas from the first step is separated from the recirculating and partly converted char particles, where the product gas exits the process while the separated char particles and bed particles enter a third process step, a third process step, conducted in one or more primary char gasification chambers, each of which comprises a fluidized particle bed where carbonaceous material remaining in the separated char is subjected to a decomposing oxidation treatment in a fluidized bed at a temperature $T_2$ between 600 and 850° C., producing a product gas which is withdrawn from the upper part of each of the one or more primary char reactors, while bed particles from the lower part of each of the one or more primary char reactors are transferred to a fourth process step, and a fourth process step, conducted in one or more secondary char gasification chambers each of which comprises a particle bed fluidized by a predominantly vertical gas flow where remaining char is subjected to a second decomposing oxidation treatment in a fluidized bed at a temperature $T_3$ between 600 and 850° C., producing a product gas which, together with recirculating particles, exits the fourth step and enters the first process step as a fluidizing gas.

2. A process according to claim 1, wherein the bed used in each of the one or more secondary char gasification chambers is fluidized using a gas having a higher weight ratio of steam to air than the average weight ratio of steam to air of the gas used to fluidize the beds in the one or more primary char gasification chambers in the third process step.

3. A process according to claim 1, wherein the mean temperature within the internal vertical reaction volume within each of the one or more secondary char gasification chambers is maintained at a temperature less than 5°C. greater than the average mean temperature within the internal reaction volume of the one or more primary char gasification chambers.

4. A process according to claim 1, wherein mass flow of fluidizing gas to each of the one or more secondary char gasification chambers is automatically controlled in response to temperature measurements in the pyrolysis chamber.

5. A process according to claim 1, wherein in the third process step, product gas, fully or primarily enters the first process step, together with a fraction of fine entrained particles.

6. A process according to claim 1, wherein the carbonaceous material comprises any one or more of cereal straw, rice straw, related grain cleaning waste streams; residues from crops including sugar cane, sorghum, beets, maize, potato, nuts, tea, cotton, wine, olive and oil palms; Algaes; energy crops; residues from short rotation forest crops based on fast growing wood including Willow and Poplar; Crops having an elevated content of salt due to growth in proximity with salty water or having other contact with salty water; residues from meat production industry including meat and bone meal; animal manure including dewatered manure slurry; Municipal and industrial organic waste, including organic fractions derived from such streams; sewage sludge; or energy containing residues.

7. The process of claim 6, wherein said Algaes comprise sea weed.

8. The process of claim 6, wherein said energy crops comprise grasses.

9. The process of claim 8, wherein said grasses comprise Miscanthus grasses.

10. The process of claim 6, wherein said energy containing residues comprise fiber or lignin products from processing wood or raw organic products.

* * * * *